US005765998A

United States Patent [19]
Zacharias et al.

[11] Patent Number: 5,765,998
[45] Date of Patent: Jun. 16, 1998

[54] PROCESS AND APPARATUS FOR ENSURING THE OPERABILITY OF GAS SEALS IN TURBOCOMPRESSORS

[75] Inventors: Wolfgang Zacharias; Helmut Schellong, both of Duisburg, Germany

[73] Assignee: Mannesmann Aktiengesellschaft, Dusseldorf, Germany

[21] Appl. No.: 669,136

[22] Filed: Jun. 24, 1996

[30] Foreign Application Priority Data

Jun. 22, 1995 [DE] Germany .............. 195 23 713.7

[51] Int. Cl.⁶ .......................................... F04B 35/04
[52] U.S. Cl. .................. 417/423.11; 417/201; 417/366; 277/3; 277/15
[58] Field of Search ............. 417/199.1, 201, 417/366, 423.5, 423.11; 277/3, 15, 23

[56] References Cited

U.S. PATENT DOCUMENTS

| 3,508,758 | 4/1970 | Strub . |
| 4,993,917 | 2/1991 | Kulle et al. . |
| 5,141,389 | 8/1992 | Bear et al. . |
| 5,348,456 | 9/1994 | Kun et al. ............... 277/3 |
| 5,412,977 | 5/1995 | Schmohl et al. . |
| 5,632,492 | 5/1997 | Lehmann et al. ........ 277/15 |

FOREIGN PATENT DOCUMENTS

| 4216006 | 4/1993 | Germany . |
| 315986 | 10/1956 | Switzerland . |
| 423075 | 3/1967 | Switzerland . |

*Primary Examiner*—Charles G. Freay
*Attorney, Agent, or Firm*—Cohen, Pontani, Lieberman, Pavane

[57] ABSTRACT

A process for ensuring the operability of gas seals in turbocompressors, especially turbocompressors with a higher operating pressure and a higher shutdown pressure which have gas-lubricated sliding-ring seals for sealing the shaft lead-throughs and in which cleaned gas is fed to the gas-lubricated sliding-ring seals from a higher-pressure tapping location proceeding from the turbocompressor. While the turbocompressor is shut down the pressure of the gas outside of the turbocompressor is increased above the pressure level prevailing during shutdown using a pressure booster unit, and the gas is fed in a cleaned state to the gas-lubricated sliding-ring seals.

6 Claims, 2 Drawing Sheets

1

PROCESS AND APPARATUS FOR ENSURING THE OPERABILITY OF GAS SEALS IN TURBOCOMPRESSORS

BACKGROUND OF THE INVENTION

1. Field of the Invention

The invention relates to a process for ensuring the operability of gas seals in turbocompressors, especially turbocompressors with a higher operating pressure and a higher shutdown pressure which have gas-lubricated sliding-ring seals for sealing the shaft lead-throughs. The invention further relates to an apparatus for carrying out the process.

2. Description of the Prior Art

Gas-lubricated sliding-ring seals must always be supplied with clean gas in order to maintain operating ability. Normally, while the turbocompressor is running, gas is removed from a higher-pressure stage and after filtration and, if necessary, drying is guided into gas seals (see the brochure "Pacific Gaspac, "Gleitringdichtungen: Das Betrieben und Überwachen von Gas-Seals unter Sicherheitsaspekten |Sliding-ring Seals: Safety Aspects of the Operation and Monitoring of Gas Seals|" by Pacific Wietz GmbH & Co KG, Dortmund). When the turbocompressor is shut down, the gas pressure is at the same level throughout the closed system. In this state, gas which has not been cleaned can reach the gas-lubricated sliding-ring seals and contaminate them so that they fail when the compressor is restarted.

SUMMARY OF THE INVENTION

Accordingly, it is an object of the present invention to provide a process for ensuring the operating ability of gas-lubricated sliding-ring seals in turbocompressors of all types of construction under all operating conditions, especially for the shutdown phase. A further object of the invention is to provide an apparatus of compact and simple construction for carrying out the process.

Pursuant to these objects, and others which will become apparent hereafter, one aspect of the present invention resides in increasing the pressure of the gas outside of the turbocompressor, while the turbocompressor is out of operation, above a pressure level prevailing during shutdown, and feeding the gas in a clean state to the gas-lubricated sliding-ring seals. In this way, it is ensured that the gas-lubricated sliding-ring seals also remain clean during the shutdown phase and accordingly achieve a long service life.

The required pressure increase is preferably effected by means of a single-stage compressor with a radial blade wheel. This compressor is arranged in a bypass line which branches off from the line at the tapping point. The apparatus is also compactly constructed and arranged in a simple manner for the purpose of subsequent installation of such a compressor for increasing pressure. The radial blade wheel is arranged directly on the driven shaft of the driving electric motor. The electric motor is designed so as to be pressure-tight and is arranged, together with the radial blade wheel, in an encapsulated housing. The power supply for the electric motor is effected via a compressed-gas feedthrough. The compressed gas is preferably cooled in partial amounts in order to keep the temperature of the electric motor low.

In the process according to the invention, the gas required for the lubrication of the sliding-ring seals is removed from the turbocompressor. However, it is conceivable to remove the gas from another location such as a pipeline or gas accumulator. Since these removal locations, in contrast to the turbocompressor, have a predetermined fixed pressure, the functioning of the sliding-ring seals is only ensured when the removal pressure is higher than the required gas pressure for the shutdown state. Otherwise, a pressure increase is also necessary.

The process and associated apparatus according to the invention are explained more fully in the drawings with reference to an embodiment showing a single-shaft compressor.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
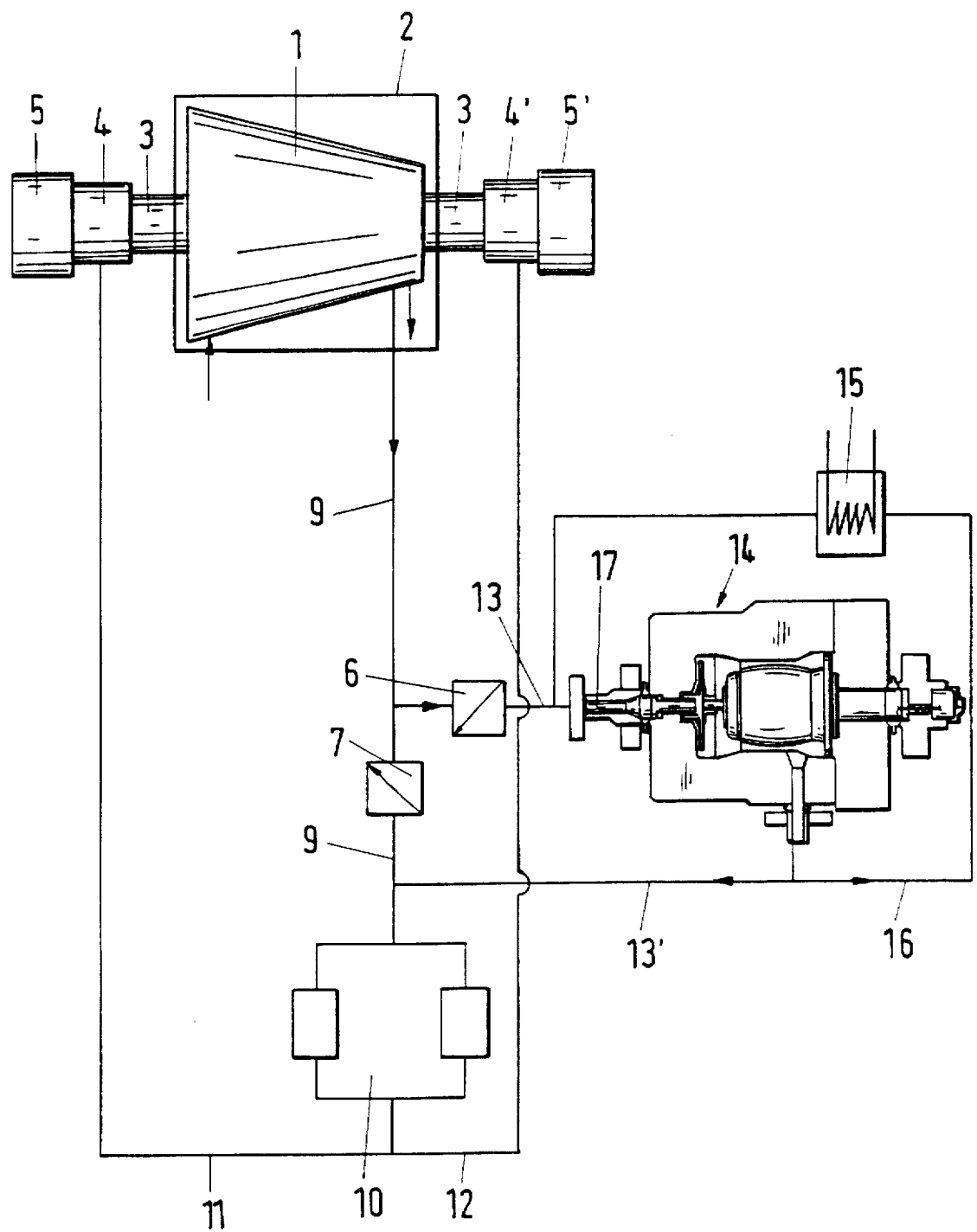
FIG. 1 shows a basic flow diagram of a general arrangement pursuant to the present invention.

FIG. 1 shows a basic flow diagram of the general arrangement according to the invention. The arrangement comprises a turbocompressor 1 whose shaft 3 exits from a housing 2 and is sealed via gas-lubricated sliding-ring seals 4, 4'. The bearing of the shaft 3 is indicated in the drawing only by two bearings 5, 5'. According to the known prior art, the turbocompressor 1 is tapped at a location of higher pressure and the gas is fed to a filter system 10 via a line 9. The filter system 10 will not be discussed in detail. After passing through the filter system 10, the cleaned gas is guided via lines 11, 12 upstream of the respective gas-lubricated sliding-ring seals 4, 4'. The additional lines shown in the drawing serve to carry off the leakage occurring in the gas-lubricated sliding-ring seals 4, 4' and to separate the gas-lubricated sliding-ring seals 4, 4' from the oil space.

Figure 2:
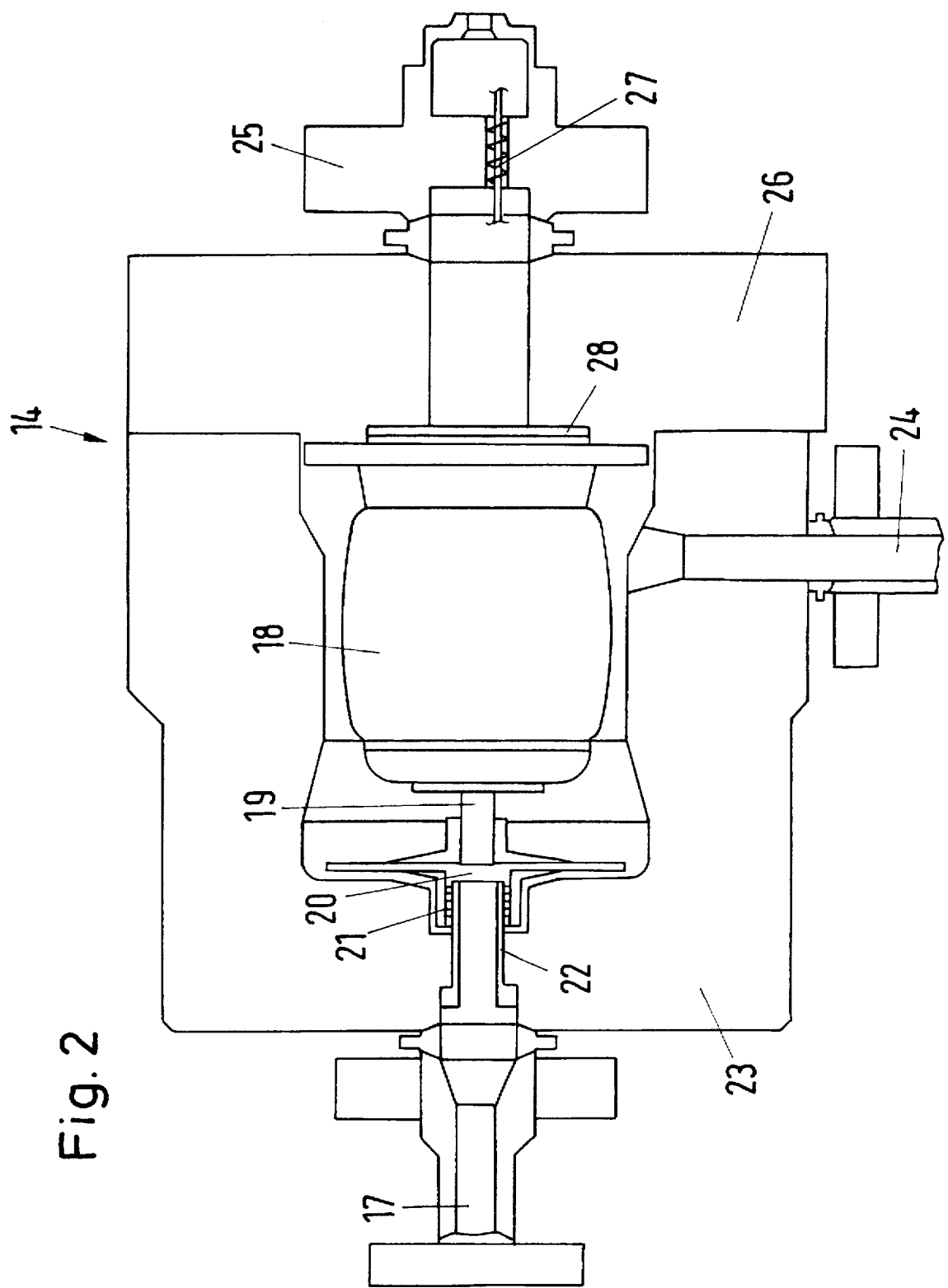
FIG. 2 shows the apparatus according to the invention in enlarged scale.

According to the invention, a bypass line 13 branches off from the line 9 between the tapping location and the filter system 10. A pressure booster unit 14 and a backflow check valve 6 are arranged in the bypass line 13. Downstream of the branch off point of the bypass line 13 from the line 9 is another check valve 7, downstream from which the line 13' connects the outlet of the pressure booster unit 14 to the line 9 ahead of the filter system 10. FIG. 2 shows details of the pressure booster unit 14. A portion of the compressed gas can be diverted from the outlet of the pressure booster unit 14 into a return line 16 and can be guided back again to the input side 17 (FIG. 2) via cooling means 15.

FIG. 2 shows an enlarged view of the pressure booster unit 14 according to the invention. The pressure booster unit 14 comprises an electric motor 18 which is designed so as to be tight against compressed gas and in which a radial blade wheel 20 is fastened to the driven shaft 19. By means of a labyrinth seal 21 which is integrated in the blade wheel 20, the return flow of compressed gas is reduced between the labyrinth seal 21 and a bushing 22 inserted in the pressure booster housing 23. The gas is fed via the input side 17 which is flanged to the housing 23. After compression, the gas exits the pressure space via the outlet side 24 which is likewise flanged to the housing 23. The power supply for the electric motor 18 is effected via a flange 25 which is fastened at a cover 26 of the housing 23. The actual feed of power is effected via a compressed-gas feedthrough line 27 which passes through the compressed gas to provide a passage for the infeed of power to the motor 18. The electric motor 18 is fastened to the inner side of the cover 26 via a flange 28. The thick walls for the housing 23 and for the cover 26 are required for a high-pressure design in order to absorb the occurring forces. At lower pressures, the dimensioning is effected in a corresponding manner.

The invention is not limited by the embodiments described above which are presented as examples only but can be modified in various ways within the scope of protection defined by the appended patent claims.

We claim:

1. An apparatus for ensuring operability of a gas seal of a turbocompressor having a shaft that extends out of a housing and is sealed by at least one gas-lubricated sliding-ring seal, the apparatus comprising: a filter unit; a line system in fluid communication with the filter unit, the at least one sliding-ring seal and a higher pressure tapping location of the turbocompressor so as to feed cleaned gas to the sliding-ring seal, the filter unit being arranged between the turbocompressor and the sliding-ring seal; a bypass line that branches off from the line system between the tapping location and the filter system; and, a pressure booster unit arranged in the bypass line.

2. An apparatus according to claim 1, wherein the pressure booster unit is a single-stage compressor with a radial blade wheel.

3. An apparatus according to claim 2, and further comprising electric motor means for directly driving the compressor the electric motor means including a driven shaft to which the radial blade wheel is fastened.

4. An apparatus according to one of claim 3, wherein the electric motor means is pressure-tight, and further comprising an encapsulated housing, the electric motor means and the radial blade wheel being arranged in the encapsulated housing.

5. An apparatus according to claim 4, and further comprising a compressed-gas feedthrough line arranged so as to pass through a compressed gas and provide a passage to supply power to the electric motor means.

6. An apparatus according to claim 1, and further comprising a return line arranged in fluid communication between an input and an output of the pressure booster unit; and cooling means arranged in the return line for cooling compressed gas from the pressure booster unit.

* * * * *